United States Patent [19]
Beck

[11] 3,921,991
[45] Nov. 25, 1975

[54] COMBINATION FLUID SEAL AND ROD WIPER

[75] Inventor: Gerald H. Beck, Salt Lake City, Utah

[73] Assignee: Parker-Hannifin Corporation, Cleveland, Ohio

[22] Filed: Jan. 17, 1974

[21] Appl. No.: 434,299

[52] U.S. Cl.................................. 277/205; 251/214
[51] Int. Cl.² ..................... F16J 15/32; F16K 41/04
[58] Field of Search ............ 251/214, 318; 285/110; 277/205

[56] References Cited
UNITED STATES PATENTS
3,064,983  11/1962  Halterman ...................... 285/113 X FOREIGN PATENTS OR APPLICATIONS
30,999    6/1884   Germany ........................... 251/214
406,757   8/1966   Switzerland ....................... 285/110
860,090   2/1961   France ............................. 277/205
1,190,797 4/1959   France ............................. 277/205

Primary Examiner—Arnold Rosenthal
Attorney, Agent, or Firm—Donnelly, Maky, Renner & Otto

[57] ABSTRACT

A combination fluid seal and rod wiper comprises a substantially ring-like member of elastomeric material having a generally U-shaped cross-sectional configuration including an arcuate squeeze seal portion and a pair of wiper tails diverging upwardly therefrom. The ring-like member is positioned in a groove around a reciprocating rod with the seal portion facing a fluid chamber and the wiper tails extending away from the fluid chamber. The seal portion is rounded to provide sealing characteristics similar to an O-ring.

7 Claims, 3 Drawing Figures

COMBINATION FLUID SEAL AND ROD WIPER

BACKGROUND OF THE INVENTION

This application pertains to the art of fluid seals and rod wipers. The invention is particularly applicable for use with spool valves and will be described with reference thereto. However, it will be appreciated that the invention has broader aspects and may be used in other pressure devices having reciprocating rods.

Previous attempts to place a combination fluid seal and rod wiper in a single groove or gland have usually proven unsuccessful because pressurization of the seal tended to distort the wiper. Such distortion usually resulted in a non-functional wiper and premature seal failure because of the poor support provided for the seal by the distorted wiper. Because of these difficulties with combination fluid seals and rod wipers, it has been conventional to provide separate fluid seals and rod wipers, each positioned in its own gland or groove. This takes away bearing area for the rod and the wiper is often eliminated.

SUMMARY OF THE INVENTION

A combination fluid seal and rod wiper comprises a substantially ring-like member of elastomeric material having a generally U-shaped cross-sectional configuration including an arcuate squeeze seal portion and a pair of wiper tails diverging upwardly therefrom. The seal portion is essentially an O-ring and has an arcuate outer bottom surface merging into opposite substantially parallel flat or cylindrical portions. The wiper tails have outer tail surfaces inclined outwardly and upwardly from the opposite flat portions. The wiper tails are separated by a groove having a groove bottom located above a line connecting the points where the outer bottom surface of the base portion merges into the opposite flat portions. The wiper tails together have a total width only slightly less than the maximum width of the seal portion across the opposite flat portions.

The combination fluid seal and rod wiper is positioned in a groove around a rod with the seal portion facing a fluid chamber. The seal portion is squeezed between the rod and the bottom of the groove, and the wiper tails extend away from the fluid chamber. The seal portion prevents distortion of the wiper tails by fluid pressure.

It is a principal object of the present invention to provide an improved combination fluid seal and rod wiper.

A further object of the invention is to provide a combination fluid seal and rod wiper which is shaped in such a manner that the wiper portion is not distorted by fluid pressure.

Another object of the invention is to position a combination fluid seal and rod wiper with its squeeze seal base portion facing the fluid chamber, and with its wiper tails extending away from the fluid chamber.

DESCRIPTION OF A PREFERRED EMBODIMENT

Figure 1:
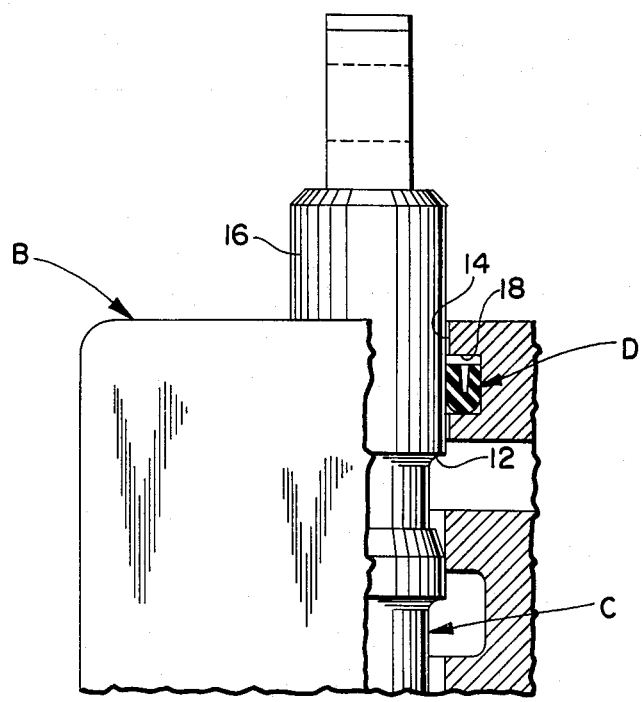
FIG. 1 is a partial cross-sectional elevational view of a spool valve having the combination fluid seal and rod wiper of the present invention incorporated therein.

Referring now to the drawing, wherein the showings are for purposes of illustrating a preferred embodiment of the invention only and not for purposes of limiting same, FIG. 1 shows a spool valve B having a fluid chamber generally indicated by numeral 12 and a cylindrical bore 14 communicating with chamber 12. A valve spool C includes a rod portion 16 reciprocatingly received in bore 14. A circumferential groove 18 having a substantially rectangular cross-sectional configuration is formed in bore 14. It will be recognized that bore 14 and groove 18 may be in a packing gland which is separately secured to the housing of spool valve B.

Figure 2:
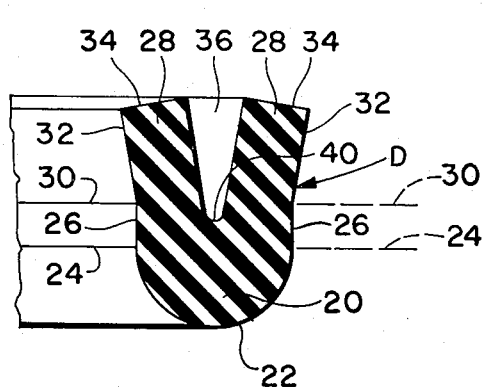
FIG. 2 is an enlarged radial cross-sectional view of the improved combination fluid seal and rod wiper of the present invention in its relaxes condition.
Figure 3:
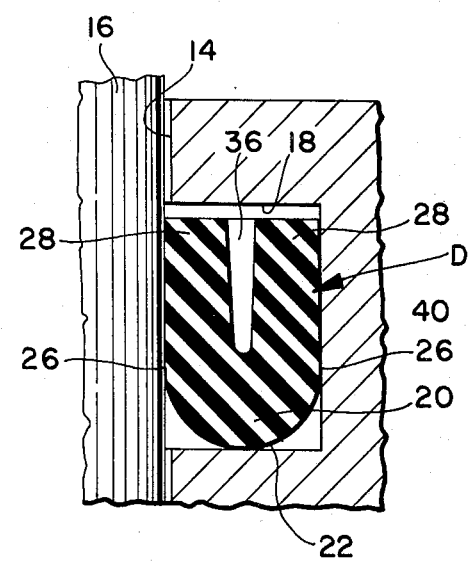
FIG. 3 is similar to FIG. 2 except showing the combination fluid seal and rod wiper in its installed position.

A combination fluid seal and rod wiper D comprises a generally ring-like member of elastomeric material received in groove 18 in surrounding relationship to rod portion 16. Member D may be molded from polyurethane, although it will be appreciated that other elastomeric materials, such as neoprene or natural rubber, can be used. Member D has a generally U-shaped cross-sectional configuration as shown in FIG. 2. Member D includes a seal portion 20 having an arcuate outer bottom surface 22 which, at the lines or points 24, is tangent to concentric radially inner and outer cylindrical areas 26. A pair of concentric wiper tails 28 diverge upwardly from the seal portion 20 with their radially inner and outer frusto-conical surfaces 32 intersecting the areas 26 at the lines 30. In the relaxed condition of the combination fluid seal and rod wiper shown in FIG. 2, tails 28 diverge upwardly with their radially inner and outer surfaces 32 inclined about 10° from vertical. Tails 28 have upper ends 34 extending substantially perpendicular to the respective tail surfaces 32.

Tails 28 are separated by a central groove 36 having a groove bottom 40 above the tangent points 24 and below the lines 30. This location of groove bottom 40 enhances sealing action of seal portion 20 and wiping action of tails 28. Tails 28 together have a total radial width which is only slightly less than the maximum radial width of seal portion 20 across the areas 26. This further insures a sealing action by seal portion 20 so that tails 28 can effectively act as wipers.

In describing the cross-sectional shape of the combination fluid seal and rod wiper, certain surfaces have been indicated as being flat or arcuate. It will be recognized that opposite surfaces 26 are cylindrical and that the arcuate outer bottom surface 22 of base portion 20 is a semi-circular toroid.

Ring-like member D is positioned in groove 18 with seal portion 20 thereof facing toward the fluid chamber 12. Seal portion 20 is radially squeezed between rod portion 16 and the bottom of groove 18 across flat portions 26 to provide an effective seal against leakage of fluid from chamber 12. Tails 28 extend from seal portion 20 away from the chamber 12, the radially inner tail 28 being yieldably biased against the surface of rod portion 16 for thoroughly wiping rod portion 16 as it is reciprocated to prevent entry of dirt into the valve B. Squeezing of seal portion 20 stabilizes the entire member D and prevents distortion of the wiper lips 28.

It will be recognized that groove 18 comprises an annular packing chamber having side walls spaced-apart radially relative to the longitudinal axis of spool C. One side wall of such annular chamber is defined by the bottom of groove 18 and the other by a portion of the outer surface of rod portion 16. The annular chamber also has end walls spaced-apart axially relative to spool C. These end walls are defined by the ends of groove 18. Line or tangent points 24 also define the center line of base portion 20. Each tail 28 has a thickness only slightly less than one-half the thickness of base portion 20 across cylindrical portions 26. This allows easy flexing of the tails while minimizing their distortion.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A combination fluid seal and wiper for installation in an annular packing chamber having radially spaced-apart side walls and axially spaced-apart end walls comprising; a ring of elastomeric material having a seal portion adapted to be radially squeezed between such side walls adjacent one end wall; and a pair of concentric wiper tails diverging axially from said seal portion to yieldably engage such side walls adjacent the other end wall; said seal portion having a rounded end surface to impart sealing characteristics to said seal portion similar to that of an O-ring; said tails defining an annular groove therebetween, the bottom of which is axially beyond the center line of said rounded end surface; said seal portion having radially outer and inner cylindrical surfaces which are tangent to said rounded end surface and which are intersected by the radially outer and inner surfaces of the respective tails.

2. The combination fluid seal and wiper of claim 1 wherein each of said tails is of radial thickness nearly one-half the radial thickness of said seal portion effectively to resist distortion by axial compression against such other end wall by fluid under pressure acting on said seal portion.

3. A combination fluid seal and wiper for installation in an annular packing chamber having radially spaced-apart side walls and axially spaced-apart end walls comprising; a ring of elastomeric material having a seal portion adapted to be radially squeezed between such side walls adjacent one end wall; and a pair of concentric wiper tails diverging axially from said seal portion to yieldably engage such side walls adjacent the other end wall; said seal portion having a rounded end surface to impart sealing characteristics to said seal portion similar to that of an O-ring; said seal portion having radially outer and inner cylindrical surfaces which are tangent to said rounded end surface and which are intersected by the radially outer and inner surfaces of the respective tails.

4. The combination fluid seal and wiper of claim 3 wherein each of said tails is of radial thickness nearly one-half the radial thickness of said seal portion effectively to resist distortion by axial compression against such other end wall by fluid under pressure acting on said seal portion.

5. In a device having a fluid chamber and a bore communicating said chamber with the exterior of said device, a rod reciprocatingly received in said bore and extending externally through said bore, an annular packing chamber in said bore surrounding said rod, said packing chamber being defined by a circumferential groove in said bore, said packing chamber having radially-spaced cylindrical side walls defined by the bottom of said groove and the outer surface of said rod, said packing chamber having axially-spaced end walls defined by the ends of said groove, a ring of elastomeric material positioned in said packing chamber and having a seal portion radially squeezed between said side walls adjacent the axially inner chamber end wall, said seal portion having a rounded end surface to provide sealing characteristics similar to an O-ring and being positioned with said rounded end surface facing said fluid chamber and directly exposed to fluid therein from between said bore and said rod, and a pair of wiper tails of substantially uniform radial thickness initially diverging from said seal portion and deformed to substantially cylindrical form between said packing chamber side walls for yieldable engagement therewith; said tails defining an annular groove therebetween which has a bottom axially beyond the center line of said rounded end surface; said wiper tails extending toward the exterior of said device and terminating in blunt annular ends substantially coextensive with the radial thickness of the respective tails and lying in a plane perpendicular to the axis of said bore and rod and parallel to the axially outer chamber end wall; each of said tails being of radial thickness nearly one-half the radial thickness of said seal portion effectively to resist distortion by axial compression of said blunt ends against such axially outer chamber end wall by fluid under pressure acting on said seal portion.

6. In a device having a fluid chamber and a bore communicating with said chamber, a rod reciprocatingly received in said bore, an annular packing chamber in said bore surrounding said rod, said packing chamber being defined by a circumferential groove in said bore, said packing chamber having radially-spaced side walls defined by the bottom of said groove and the outer surface of said rod, said packing chamber having axially spaced end walls defined by the ends of said groove, a ring of elastomeric material positioned in said packing chamber and having a seal portion radially squeezed between said side walls, said seal portion having a rounded end surface to provide sealing characteristics similar to an O-ring and being positioned with said rounded end surface facing said fluid chamber, and a pair of wiper tails diverging from said seal portion and yieldably engaging said packing chamber side walls; said tails defining an annular groove therebetween, the bottom of which is axially beyond the center line of said rounded end surface; said seal portion having radially outer and inner cylindrical surfaces which are tangent to said rounded end surface and which are intersected by the radially outer and inner surfaces of the respective tails.

7. The device of claim 6 wherein each of said tails is of radial thickness nearly one-half the radial thickness of said seal portion effectively to resist distortion by axial compression against such other end wall by fluid under pressure acting on said seal portion.

* * * * *